No. 636,262. Patented Nov. 7, 1899.
T. F. HICKEY.
BLIND STOP.
(Application filed Apr. 28, 1899.)
(No Model.)
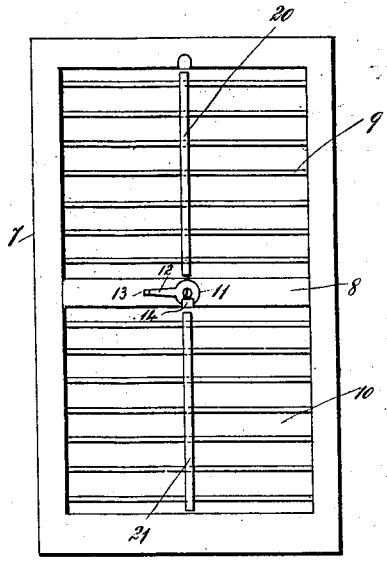
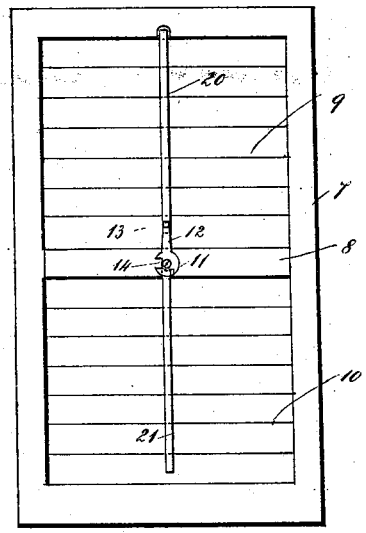
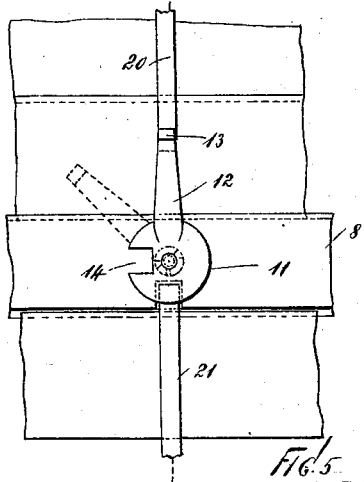
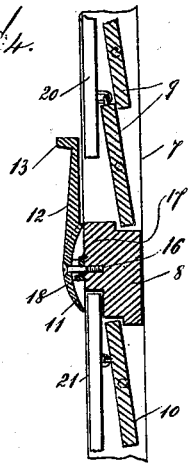
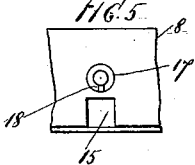
WITNESSES
INVENTOR
Thomas Francis Hickey
BY
ATTORNEYS.
THE NORRIS PETERS CO., PHOTO-LITHO., WASHINGTON, D. C.

United States Patent Office.

THOMAS FRANCIS HICKEY, OF JOHNSONVILLE, NEW YORK, ASSIGNOR OF ONE-HALF TO CHARLES H. DEAN, OF SAME PLACE.

BLIND-STOP.

SPECIFICATION forming part of Letters Patent No. 636,262, dated November 7, 1899.

Application filed April 28, 1899. Serial No. 714,850. (No model.)

*To all whom it may concern:*

Be it known that I, THOMAS FRANCIS HICKEY, a citizen of the United States, residing at Johnsonville, in the county of Rensselaer and State of New York, have invented certain new and useful Improvements in Stops or Fastening Devices for Window-Shutters, of which the following is a full and complete specification, such as will enable those skilled in the art to which it appertains to make and use the same.

This invention relates to stops or fastening devices for use in connection with window-shutters; and the object thereof is to provide a device of this class which is designed to be connected with the inside of the usual frame and operate so as to lock or hold the pivoted transverse slats of the shutter in a closed position.

The invention is fully disclosed in the following specification, of which the accompanying drawings form a part, in which—

Figure 1 is an inside view of a window-shutter provided with my improvement and showing the pivoted transverse strips in an open position; Fig. 2, a similar view showing said strips in a locked position; Fig. 3, a view similar to Fig. 1, showing the parts on an enlarged scale; Fig. 4, a partial section on the line 4 4 of Fig. 3, and Figs. 5 and 6 outside and inside views of details of the construction.

In the drawings forming part of this specification the separate parts of my improvement are designated by the same numerals of reference in each of the views, and in said drawings I have shown at 7 the frame of an ordinary window-shutter which is provided centrally with a transverse bar 8 and with the usual transversely-arranged and pivoted slats 9 in the upper part thereof and with similar transversely-arranged and pivoted slats 10 in the bottom portion thereof, all these features of construction being similar to those usually employed.

In the practice of my invention I pivot to the central transverse bar 8 and centrally thereof a circular disk 11, which is preferably convexo-concave in form, the convex surface being directed outwardly, and said disk is provided at one side with a radial arm 12, which is provided at its end with an outwardly-directed knob or handle 13.

The disk 11 is provided in one side with a radial notch or recess 14, and a corresponding notch or recess 15 is formed centrally in the lower edge of the bar 8. The pivot pin or screw 16, by which the disk 11 is secured to the bar 8, passes through a ring or plate 17, secured to the bar 8, which is provided at one edge with a lug or projection 18, and the disk 11 is provided on the inner side thereof and adjacent to the central opening through which the pivot pin or screw 16 passes and on the opposite sides thereof with lugs or projections 19.

The slats 9 in the upper portion of the shutter are connected in the usual manner by a pivoted slat-rod 20 and those in the lower portion of the shutter by the usual slat-rod 21, and when it is desired to lock all the slats in the closed position, as shown in Figs. 2, 3, and 4, the arm 12 of the disk 11 is turned upwardly, in which position it overlaps the lower end of the slat-rod 20, and the lower edge of the said disk overlaps the upper end of the slat-rod 21. In this position of the parts neither the upper nor the lower slats can be opened or turned into the position shown in Fig. 1.

When it is desired to open both the upper and lower slats, the disk 11 is turned into the position shown in Fig. 1, and in this position it will be evident that both the upper and lower slats can be opened, as the disk 11 and the arm 12 will not engage with either of the rods 20 or 21. When the arm 12 of the disk 11 is turned into the position shown in dotted lines in Fig. 3, the disk 11 will still hold the lower rod 21, while the upper rod 20 will be free, and the upper slats 9 may then be opened, while the lower slats 10 will be locked in the closed position.

The lugs or projections 19 on the inner side of the disk 11 and the lug or projection 18 on the ring or plate 17 are designed to hold said disk and prevent the same from turning through more than one-quarter of a revolution, and the notch or recess 14 in said disk is at a distance of ninety degrees from the arm 12, and the lugs or projections 18 and 19 will normally hold said disk in the position shown in Fig. 2, in which the notch or recess 14 is at the left, or with said notch or recess directly over the pivot pin or screw, in which position the arm 12 will project to the right.

This device is simple in construction and operation and also comparatively inexpensive and perfectly adapted to accomplish the result for which it is intended and may be applied to window-shutters as usually constructed, and by means thereof the slats of a window-shutter may be locked either in the open or closed position whenever desired.

Having fully described my invention, I claim as new and desire to secure by Letters Patent—

1. A device of the class described, comprising a disk which is adapted to be pivoted to the central bar of a shutter, said disk being provided at one side with a radial arm, and at a predetermined distance from said arm with a radial notch or recess, substantially as shown and described.

2. The combination with the central bar of a window-shutter, of a disk pivoted thereto and provided at one side with an arm, and at a predetermined distance therefrom with a radial notch or recess, and means for limiting the movement of said disk on its pivotal support, substantially as shown and described.

In testimony that I claim the foregoing as my invention I have signed my name, in presence of the subscribing witnesses, this 25th day of April, 1899.

THOMAS FRANCIS HICKEY.

Witnesses:
    MICHAEL WELCH,
    JACOB S. ROSS.